Figure 1:
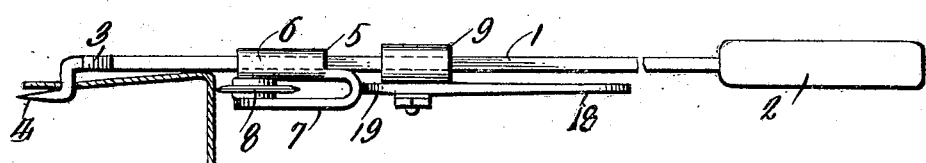

Feb. 3, 1925.

J. PORRIER

CAN OPENER

Filed April 24, 1922

1,524,996

WITNESSES

JOSEPH PORRIER INVENTOR.

BY

ATTORNEY.

Patented Feb. 3, 1925.

1,524,996

UNITED STATES PATENT OFFICE.

JOSEPH PORRIER, OF HOUGHTON, MICHIGAN.

CAN OPENER.

Application filed April 24, 1922. Serial No. 556,286.

*To all whom it may concern:*

Be it known that I, JOSEPH PORRIER, a citizen of the United States, residing at Houghton, in the county of Houghton and State of Michigan, have invented certain new and useful Improvements in Can Openers, of which the following is a specification.

The present invention relates to can openers and has for its principal object to provide a device of this nature whereby the cutting means may be readily adjusted so that the device may be used for cutting cans of several sizes.

Another important object of the invention is the provision for means whereby a can may be opened at its sides adjacent its upper end so that after the can has been opened there will be no obstruction in removing the contents therefrom.

Another object of the invention is the provision of a device engageable with the top of a can at its center having adjustable cutting means for engaging the side of the can adjacent its upper portion when the device is moved in an arc of a circle.

A still further object of the invention is to generally improve upon can openers of this nature by providing a device which will be extremly simple and efficient in construction, reliable in operation, inexpensive in manufacture, and well adapted to the purpose for which it is designed.

With these and numerous other objects in view as will become more apparent as the description proceeds, the invention consists in certain novel features of construction, combination and arrangement of parts as will be hereinafter more fully described and claimed.

In the drawing:—

Figure 2:
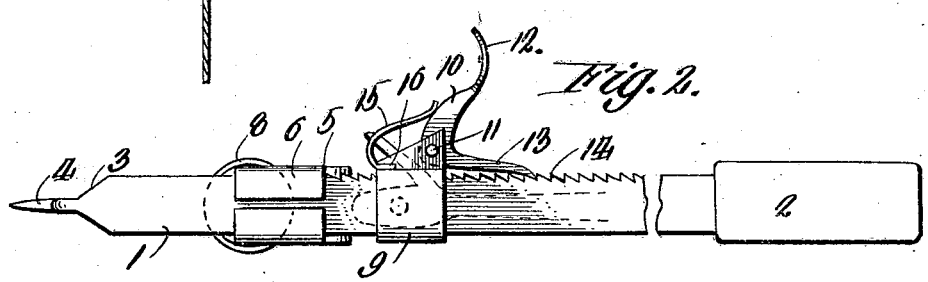
Figure 3:
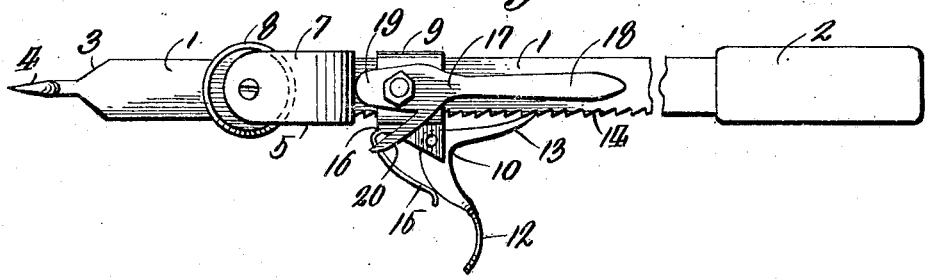

Figure 1 is a side elevation of a can opener constructed in accordance with my invention, Figure 2 is a top plan view of the same, and Figure 3 is a bottom plan view thereof.

Referring to the drawing in detail it will be seen that the shank 1 is formed from a flat bar having on one end a suitable handle 2 while the other end thereof is tapered so as to be pointed as at 3 and terminates in an offset pointed retaining member 4 that is adapted to penetrate the center portion of the top of the can as shown in Figure 1 so that a fulcrum may be provided for the shank when it is rotated in a horizontal plane. The adjustable cutting element consists of a slidable carriage indicated generally at 5 which includes the sleeve 6 and bracket 7. The sleeve 6 embraces the shank and is slidable thereon while the bracket 7 is of substantial U-shaped structure and supports between itself and the sleeve the rotatable cutting element 8 in the form of a disk knife.

The locking means for holding the carriage 5 in place so as to retain the rotary cutting element 8 in engagement with the side of the can includes a U-shaped supporting plate 9 slidably mounted on the shank 1 and having a dog 10 pivoted at 11 between its terminals. This dog 10 is of angular construction one end thereof acting as an operating lever indicated at 12 and the other end thereof namely 13 engaging the series of teeth 14 arranged along one longitudinal edge of the shank 1. The engaging end 13 is retained in engagement with the teeth 14 by a curved leaf spring 15 which has its free end in engagement with the lever 12 of the dog 10 and its other end fixed in the notches 16 of the U-shaped plate 9. A cam element is fulcrumed on the plate 9 and is in the form of a lever 17 including the handle or operating portion 18 and the cam proper 19 which is adapted to engage the bracket 7 and force the rotary cutting element 8 in engagement with the side of the can when the operator lever 18 is extending in alignment with the shank 1 as shown to advantage in Figure 3. An extension 20 is provided on the operating lever 18 and preferably extends at an acute angle from the cam proper 19 and is adapted to engage the bracket 7 should the operating lever 19, referring to Figure 3, be further rotated in a clock-wise direction.

From the above description taken in connection with the accompanying drawings, it will be seen that a can opener has been provided including simplicity and positiveness of operation whereby efficiency of the work done is combined with the cheapness of production. The modification, however, disclosed in the drawing has merely been illustrated by way of example and it is to be understood that minor changes in construction, combination, and arrangement of parts may be made without departing from the spirit and scope of the invention as claimed.

Having thus described my invention what I claim as new is:—

1. In a can opener, in combination with a shank having a piercing point, a knife carriage slidable on the shank, a locking member independently slidable on the shank, a cam element mounted on the locking member and engageable with the knife carriage and means on the locking member for holding the same in engagement with the shank.

2. In a can opener, a shank having a piercing point, a knife carriage slidable on the shank, and a locking device therefor including a body member independently slidable on the shank, a cam mounted thereon for engagement with the knife carriage and means mounted thereon for engagement with the shank for retaining the locking mechanism in an adjusted position.

3. In a can opener, a toothed shank having a piercing point, a knife carriage slidably mounted on the shank, a plate slidably mounted on the shank, a dog mounted on the plate for engagement with the toothed shank, a spring for holding the dog in engagement with the toothed shank, and a cam fulcrumed on the plate for engagement with the carriage.

In testimony whereof I affix my signature in presence of two witnesses.

JOSEPH PORRIER.

Witnesses:
 ELIZABETH CHAMPION,
 THOMAS JOHN DRAKE.